Aug. 21, 1934.   V. E. CARBONARA   1,970,543
NAVIGATING INSTRUMENT
Filed May 16, 1931

INVENTOR
Victor E. Carbonara.
BY
F.B.Smith
ATTORNEY

Patented Aug. 21, 1934

1,970,543

UNITED STATES PATENT OFFICE 1,970,543

NAVIGATING INSTRUMENT

Victor E. Carbonara, Brooklyn, N. Y., assignor to Pioneer Instrument Company, Incorporated, Brooklyn, N. Y., a corporation of New York Application May 16, 1931, Serial No. 537,974

22 Claims. (Cl. 88—2.7)

The present invention relates to navigating instruments and more particularly to instruments of the telescopic type wherein an artificial horizon is employed, as for example sextants and octants, and embodying a novel and compact structure especially adapted for use on aircraft.

It has long been known in the art that a liquid bubble-level may be employed as an artificial horizon in conjunction with instruments wherein it is desired to correlate the position of a body with respect to the horizon, as for example in navigating instruments such as sextants or octants. An artificial horizon of this type, known as the Willson Artificial Horizon, has been illustrated, described and claimed in the U. S. Patent 1,705,146 issued March 12, 1929 in the name of the late Professor R. W. Willson. Although this type of artificial horizon is excellent when employed for daylight observations of the sun, it is not very suitable or efficient for obtaining observations of stars at night. For night use, this type of instrument is provided with a source of illumination such as an electric lamp energized from a dry cell for illuminating the bubble field so that the bubble appears as a dark ring against an illuminated field. This illuminated field when superimposed on the image of a faint star, distracts a great deal from the luminosity of the latter, rendering it quite difficult, if not altogether impossible, to observe important stars of second magnitude, such as Polaris for example. Accordingly, one of the objects of the present invention is to provide a novel navigating instrument in which the foregoing difficulties are obviated.

Another object of the invention is to provide a navigating instrument for obtaining observations at night as well as during the day, and embodying a novel liquid bubble-level or artificial horizon wherein the bubble field is rendered non-luminous and only the bubble is illuminated, whereby an image of a faintly luminous celestial body may be readily perceived on the dark field and easily correlated with the illuminated bubble.

Another object of the invention is to provide a novel bubble-level adapted to be employed in the dark and embodying means whereby only the bubble is illuminated without apparent illumination of the liquid which forms the bubble.

A further object is to provide an artificial horizon embodying a novel liquid bubble-level wherein the side walls of the vessel containing the liquid forming the bubble, are made transparent so that light may be admitted all around the bubble thereby illuminating only the bubble and rendering the bubble field relatively dark.

Another object is to provide in a liquid bubble-level novel means for illuminating said bubble while the field thereof remains dark.

A still further object is to provide in a liquid bubble-level, novel illuminating means for passing light through the liquid whereby only the bubble is illuminated by reason of the difference in the indices of refraction of the liquid and the bubble.

Another object is to provide in combination with a navigating instrument, as for example a sextant, a novel bubble telescope wherein the bubble appears in the form of a luminous ring on a dark field whereby images of faintly luminous bodies may be readily perceived and easily correlated with the bubble.

Another object is to provide in an instrument for measuring angles between objects, a novel and compact structure embodying handles for holding the instrument in operating position and in one of which is included a mechanism for determining such angles whereby the manipulation of the instrument is greatly facilitated.

Still another object of the invention is to provide a navigating instrument embodying a novel and compact structure, and which is relatively small, light, and easily manipulated and therefore particularly suited for use on aircraft.

Other objects and advantages of the invention will appear more fully hereinafter from a consideration of the detailed description which follows, together with the accompanying drawing wherein is illustrated one embodiment of the invention. It is to be expressly understood, however, that the drawing is for the purpose of illustration and description only and is not designed as a definition of the limits of the invention, reference being had for this purpose to the appended claims.

In the drawing, wherein like reference characters refer to like parts through the several views, Fig. 1 is a plan view with some parts in section of one form of navigating instrument embodying the present invention;

Figure 1:
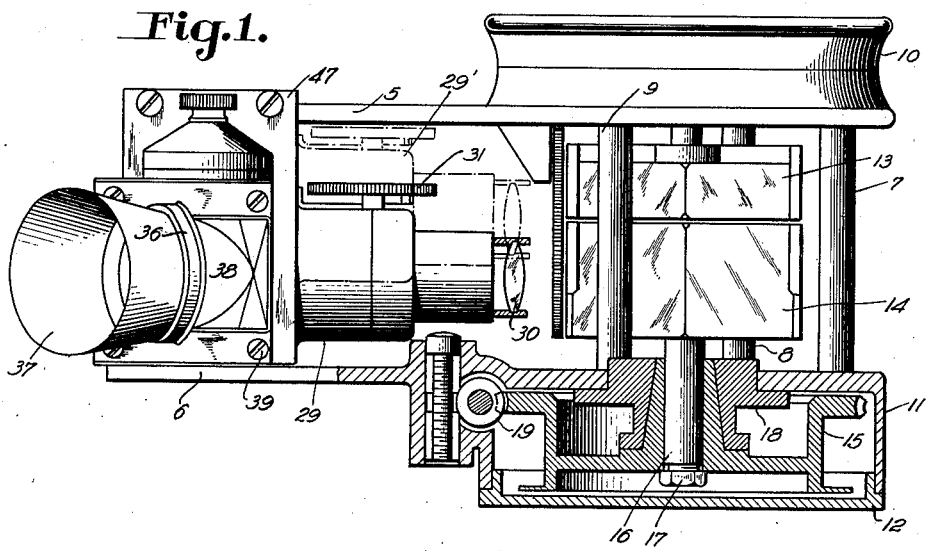

The instrument embodying the present invention is shown in the drawing in the form of a sextant, the construction of which in itself is novel, thereby rendering the completed instrument small and compact and particularly adapted for use on aircraft. In the illustrated embodiment, the instrument consists of a pair of spaced parallel plates 5 and 6 of any suitable material, preferably aluminum so that the instrument is rendered light without sacrificing durability, although any other suitable material may be employed as, for example, hard rubber or a phenolic condensation product. The plates 5 and 6 are secured together in any suitable manner, as for example by means of spacing bars or rods 7, 8, and 9. Suitable means are provided for conveniently and firmly holding the instrument when observations are being taken, and in the form shown comprise a pair of gripping members 10 and 11 which may be in the form of drums secured to or formed integral with plates 5 and 6 respectively on the sides thereof. Drum 11 is preferably made hollow so as to form a housing together with a cover plate 12 for certain parts of the operating mechanism of the instrument.

Suitably mounted between the plates 5 and 6 and supported thereby, are a fixed prism 13 and a rotatable prism 14 which in the present instrument constitute the horizon prism and index prism respectively, the former being employed when observations are taken in the daytime and it is desired to view a natural horizon. The rotatable prism 14 is suitably connected to a worm wheel 15 as by means of a shaft 16, the wheel being locked on the shaft by a screw 17, and journaled in the drum 11 as by means of a bushing or bearing 18. The worm wheel 15 is drivably connected to a worm 19 secured to or formed integral with a shaft 20 which extends up through the housing and is guided and journaled therein by means of a bushing 21. A knurled knob or thumb wheel 22 is secured to the shaft 20 as by a set screw 23 for operating the worm 19 and worm wheel 15 to rotate the index prism 14. The thumb wheel 22 and the mechanism which it controls are so arranged that thumb wheel 22 may be easily rotated by a slight motion of the thumb when the instrument is gripped in the palms of the operator's hands by the drums 10 and 11.

A suitable scale is provided for indicating the angular positions of the rotatable index prism 14 relative to the horizon and comprises a series of circumferentially spaced graduations 24 arranged over a portion of the side face of the worm wheel 15 which may be viewed through a window 25 formed in the cover plate 12 of the housing 11 and having an index line 26 cooperating with the scale. A Vernier scale is also provided for obtaining more accurate readings of the angular positions of the index prism and comprises a series of graduations 27 inscribed on the periphery of the thumb wheel 22 around the base thereof and cooperating with an index line 28.

Figure 2:
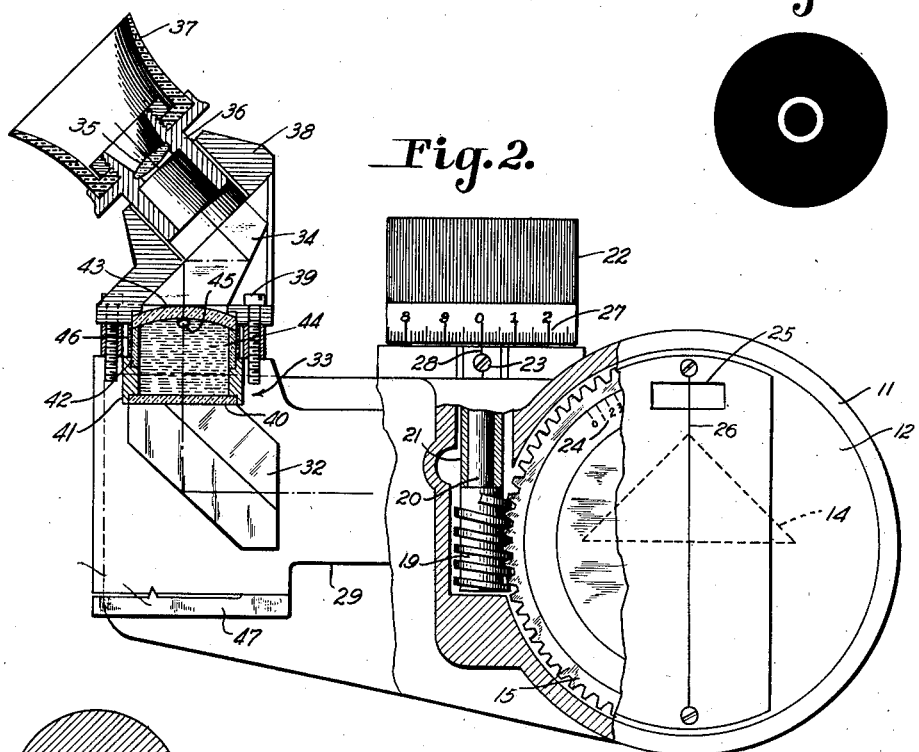
Fig. 2 is a side elevation with portions broken away and some parts in section of the form of the instrument shown in Fig. 1.

Means are provided for viewing distant bodies through the index prism 14 such as heavenly bodies from which one's position on the earth's surface is to be determined. In the form shown, said means comprise a telescope 29 having an objective lens 30, the position of which may be adjusted relative to the eye-piece by means of a thumb screw 31. The optical system of the telescope includes in addition to the objective lens 30, a total reflecting prism 32 (Fig. 2), the novel liquid bubble-level 33, another reflecting prism 34, and an eye lens 35 positioned within the cylindrical member 36 to which is secured the eye buffer or guard 37. The cylindrical member 36 is arranged for slidable engagement with a support 38 secured to the telescope in any suitable manner as by means of screws 39 so that the position of the eye-lens 35 may be adjusted relative to the prism 34.

The novel bubble-level embodying the present invention is arranged directly in the path of the image-forming rays as indicated at 33, and constitutes a part of the optical system of the telescope, so that the amount of light illuminating the bubble is always proportional to the amount of light coming in through the objective. In the form shown, the bubble-level comprises a chamber consisting of a transparent glass bottom plate 40 and a metallic cylindrical wall 41, a cylindrical wall 42 of some suitable transparent material, preferably glass, secured to the first cylinder 41, and a concavo-convex meniscus 43 which is utilized both as a field lens and a cover for the bubble chamber at the same time. The chamber is filled with a suitable liquid 44 having the desired characteristics as to viscosity, transparency and index of refraction. A bubble 45 is permitted to remain in the chamber and serves as the reference member of the artificial horizon.

Figure 4:
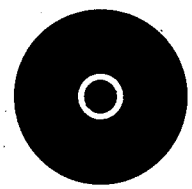
Fig. 4 is a similar view showing a bubble field as viewed in an instrument embodying the present invention wherein only the bubble is illuminated and appears in the form of a luminous ring on a dark background.

It is desirable to provide means for illuminating the bubble 45 when the latter is used as a reference point for obtaining observations at night, and to this end the outer surface of the glass cylinder 42 is coated with a layer of some suitable luminous material 46 such as radium paint, for example. By this novel arrangement of illumination, the light emitted by the luminous material 46 is thus crossing a homogeneous medium as represented by the liquid 44 which fills the bubble vessel, and such light will not be visible except at the point where the light meets heterogeneous bodies in suspension in the liquid. The bubble 45 is obviously such a heterogeneous body relative to the liquid, since it is formed by a vapor having an index of refraction which is considerably different from that of the liquid filling the remainder of the vessel. The result thus produced by this novel method of illumination is a bubble which appears as a faintly illuminated ring on a perfectly dark background, as shown in Fig. 4 of the drawing, there being no apparent illumination of the liquid.

Figure 3:
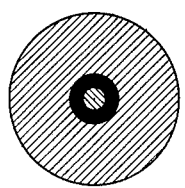
Fig. 3 is a diagrammatic illustration of a field as viewed in a bubble telescope wherein the field is illuminated and the bubble appears in the form of a dark ring.

Heretofore, it was customary when making night observations of heavenly bodies, such as stars, to illuminate the bubble field so that the bubble would appear as a dark ring against an illuminated field, as shown in Fig. 3 of the drawing. As pointed out hereinbefore, this illuminated field would detract a great deal from the luminosity of the image of a faint star when the image was superimposed thereon, rendering it very difficult, if not altogether impossible, to observe important stars of second magnitude. In the novel arrangement of the present invention, the vessel containing the bubble is made of transparent material so that light from the luminous material may be admitted to all sides of the bubble, thereby rendering the bubble visible while the background on which the bubble appears remains dark so that the luminosity of stars observed in the dark background is absolutely unimpaired, and faint stars of third and fourth magnitude are plainly visible through the telescope.

Means are also provided for adjusting the telescope 29 so that the objective lens 30 may be positioned entirely in front of the index prism 14 when night observations are to be obtained by means of the bubble horizon, or so that it may be positioned until the objective lens 30 partly covers the fixed or horizon prism 13 and the index prism 14 when it is desired to view the natural horizon and employ the latter as a reference line when obtaining daylight observations. For this purpose, the telescope is slidably mounted between the plates 5 and 6 in any suitable manner, as for example by means of a cross support 47.

When it is desired to obtain an observation in the daytime with reference to a natural horizon, the telescope is moved on the support 47 until its objective lens partly covers the fixed prism 13 through which a reference line such as the sea's horizon can be viewed, and also the index prism 14 which may be rotated in the usual manner by means of the thumb wheel 22 so as to bring the image of an object, as for example the sun, viewed through prism 14 in coincidence with or adjacent to the image of the reference line viewed through prism 13.

When the bubble 45 is to be employed as a reference point in obtaining observations at night, the telescope is moved so as to have its objective entirely in front of the index prism 14 in which case only the image reflected through prism 14 will be visible and brought into coincidence with said bubble. Heretofore, whenever a bubble-level was employed and the bubble used as a reference point, an image of the bubble was brought into the optical system instead of the bubble itself. In the present arrangement, the bubble vessel is directly in the path of the image-forming rays so that the bubble itself is in such path, thus constituting a part of the optical system of the telescope and therefore the amount of light illuminating the bubble is always proportional to the amount of light coming in through the objective.

From the foregoing, it will be apparent that there is provided by the present invention, a novel construction of a navigating instrument which renders the latter compact, small, and light, and particularly adapted for use on aircraft where it is desired to save space and reduce weight. The construction is very simple so that the instrument may be easily assembled and manufactured economically on a production basis. The instrument may also be easily manipulated so that observations and readings may be obtained quickly and accurately. There is also provided a novel illuminating system whereby the efficiency of the instrument is greatly increased when employed for obtaining observations at night so that faintly luminous stars which heretofore could not even be seen with instruments of this type, are now brought clearly into view.

Although the liquid-level embodied in the present invention has been shown and described in combination with a novel navigating instrument, namely, a sextant or octant, it is obvious that it may be employed in other situations where it is desirable to determine accurately the relation of any thing or object to the horizontal direction, as, for example, in levels for machine beds, sighting levels for construction engineers; artificial horizons; surveyor's levels, theodolites, transits, plane-tables, and compasses; mariners' and air-pilots' quadrants, magnetic and gyroscopic compasses; astronomical instruments such as sun-dials, astrolabes, or equatorial, altazimuth, meridian-transit and zenith-transit telescope mountings; mapping, measuring and recording devices employing a photographic image of the object field; in levels associated with instruments such as chemists' balances, galvanometers and seismographs; and the invention therefore contemplates the use of the liquid-level with all instruments which are adapted to be used in places in which the relationship of a point or thing to the geodetic vertical or the horizontal derived therefrom is important.

Therefore, while only one embodiment of the invention has been illustrated and described, other changes and modifications in the mechanical form and arrangement of parts, which will now appear to those skilled in the art, may be made without departing from the scope of the invention. Reference is therefore to be had to the appended claims for a definition of the limits of said invention.

What is claimed is:

1. In apparatus for measuring the angle between two objects, the combination of a pair of spaced parallel members, means formed with said members and constituting handles for holding the apparatus in operating position, means arranged between said members for forming in a common focal plane images of said objects, a rotatable reflecting member associated with the means for forming one of said images, and means associated with one of said handle members for measuring the angle of rotation of said reflecting member and including a mechanism in said handle member for correlating the images of said objects in said common focal plane.

2. In apparatus for measuring the angle between two objects, the combination of a pair of spaced parallel members, means formed with said members and constituting handles for holding the apparatus in operating position, means arranged between said members for forming in a common focal plane images of said objects, a pair of adjacent reflecting members associated with said image-forming means and one of which is adapted to be rotated, means for shifting said image-forming means laterally of the two parallel members so that said image-forming means may be positioned in front of either or both of said reflecting members, and means for measuring the angle of rotation of the rotatable reflecting member.

3. In apparatus for measuring the angle between two objects, the combination of a pair of spaced parallel plates, means formed with said plates and constituting handles for holding the apparatus in operating position, means arranged between said plates and adapted to be shifted transversely thereof for forming images of said objects in a common focal plane, a rotatable reflecting member associated with said image-forming means, and means including a driving member positioned interiorly of one of the handles for measuring the angle of rotation of said rotatable reflecting member.

4. In an apparatus for measuring the angle between two objects, the combination of a pair of parallel plates, means securing said plates in spaced relation, means formed with said plates to provide handles for holding the apparatus in operating position and comprising a pair of drums one of which forms a casing, means arranged between said plates for forming images of said objects in a common focal plane, a pair of adjacent reflecting members associated with said image-forming means and one of which is adapted to be rotated, means for shifting said image-forming means into position in front of either or both of said reflecting members, and means including a driving member positioned in the handle casing for measuring the angle of rotation of said rotatable reflecting member.

5. An instrument for measuring the angle between two objects comprising in combination, a pair of spaced parallel plates, means formed with said plates to provide handles for holding the instrument in operating position, means arranged between said plates for forming images of said objects in a common focal plane, a pair of adjacent reflecting members associated with said image-forming means and one of which is adapted to be rotated, means for shifting said image-forming means into position in front of either or both of said reflecting members, a liquid-level constituting a part of the optical system of said image-forming means for providing an artificial horizon when said image-forming means is positioned in front of the rotatable reflecting member, and comprising a vessel containing a homogeneous liquid having a heterogeneous body floating therein, and means for passing light through said liquid transversely of the vessel so that the heterogeneous body which serves as a reference member with which the image viewed through the rotatable reflecting member is correlated, is illuminated without producing any apparent illumination of the liquid, and means for measuring the angle of rotation of said rotatable reflecting member.

6. An instrument for measuring the angle between an object and a horizontal reference line comprising in combination, a pair of parallel plates, means securing said plates in spaced relation, means formed with said plates to provide handles for holding the instrument in operating position and comprising a pair of drums one of which constitutes a casing, a fixed horizon prism mounted between said plates, a rotatable index prism positioned adjacent said fixed prism and through which the object may be viewed, means arranged between said plates for forming, in a common focal plane, images of the object viewed through the index prism and of the horizon viewed through the fixed prism, means for shifting said image-forming means into position in front of either or both the horizon prism and the index prism, a liquid-level constituting part of the optical system of said image-forming means for providing an artificial horizon with which the image of the object viewed through the index prism may be correlated, said liquid-level comprising a vessel having transparent side walls and a transparent bottom and cover lens, a transparent liquid in said vessel forming a bubble, means for emitting artificial light on all sides of the bubble through the liquid, said light emitting means being arranged to cause illumination of the bubble without producing apparent illumination of the liquid so that the bubble appears in the form of a luminous ring on a dark background when the instrument is employed for obtaining observations at night, and means for measuring the angle of rotation of the rotatable index prism.

7. In an instrument for the measurement of angles, the vertices of which are at said instrument, the combination of a pair of parallel plates, means securing said plates in spaced relation, means formed with said plates to provide handles for holding the instrument in operating position and comprising a pair of drums one of which constitutes a casing, a fixed horizon prism mounted between said plates through which the natural horizon may be viewed, a rotatable prism adjacent said fixed prism and through which a distant object is to be viewed for correlation with the horizon in determining the angle therebetween, a telescope arranged between the parallel plates for sighting the object and the horizon through said prisms, means for shifting the telescope transversely of the plates into position in front of either or both of the prisms, a liquid-level constituting part of the optical system of the telescope to provide an artificial horizon when the telescope is positioned entirely in front of the index prism, said liquid-level comprising a cylindrical vessel having transparent side walls and a transparent top and bottom, a transparent liquid in said vessel forming a bubble therein which constitutes the reference member of the artificial horizon, means for emitting artificial light on all sides of the bubble through the liquid so that the instrument may be employed for obtaining observations at night, said light emitting means causing illumination of the bubble without producing apparent illumination of the liquid so that the bubble appears in the form of a luminous ring on a dark background, and means for measuring the angle of rotation of the rotatable index prism, said last mentioned means including a thumb wheel positioned adjacent the handle which constitutes a casing and a transmission member within said casing for rotating the index prism upon rotation of the thumb wheel.

8. An instrument for measuring angles between objects, comprising in combination, a pair of parallel members secured together in spaced relation, means formed with said members to provide handles for holding the instrument in operating position, sighting means positioned between said parallel members, and means associated with one of said handles for determining the angle between the objects observed in said sighting means and including a mechanism in said handle for correlating the images of said objects in said sighting means.

9. A sighting instrument for measuring angles between objects, comprising in combination, a pair of parallel plates secured together in spaced relation, means integral with each of said plates forming handles for holding the instrument in sighting position and comprising a pair of drums one of which constitutes a casing, sighting means positioned between said plates and having its axis parallel thereto, means for shifting said sighting means transversely of said plates to discriminate between objects sighted, and means associated with the handle which constitutes a casing for determining the angle between the objects sighted including mechanism in said casing for correlating the images of said objects in said sighting means.

10. In an instrument for measuring the angle between two objects, the combination of means constituting a pair of handles for holding the instrument in operating position, means for forming and simultaneously viewing an image of each of said objects, means for causing one of said images to appear on a dark background while illuminating the other image whereby both of said images are rendered readily discernible, means for deviating the light forming the latter image, and means including a driving member in one of said handles and drivably connected to said light deviating means for measuring the angle of said deviation.

11. In an instrument for measuring the angle between two objects, the combination of means constituting a pair of handles for holding the instrument in operating position, means for forming and simultaneously viewing an image of each of said objects, means for illuminating one of said objects and embodying a luminescent material associated with said latter object and so arranged with respect thereto that the image thereof appears highly luminous while the field on which the image is formed remains entirely dark, means for deviating the light forming the other image, and means including a driving member in one of said handles and drivably connected to said light deviating means for measuring the angle of said deviation.

12. In an instrument for measuring the angle between two objects one of which is luminous, the combination of means constituting a pair of handles for holding the instrument in operating position, means for forming and simultaneously viewing an image of each of said objects in the same field of view, means for causing the illumination of the image of the non-luminous object while completely preventing the illumination of the field on which said image is formed whereby the luminosity of the image of the luminous object is not impaired and both images are rendered clearly discernible, means for deviating the light forming the image of the luminous object, and means including a driving member in one of said handles and drivably connected to said light deviating means for measuring the angle of such deviation.

13. In an instrument for measuring the angle of elevation of a luminous celestial body above a horizontal plane, the combination of means constituting a pair of handles for holding the instrument in operating position, means for determining said horizontal plane and including a liquid level having a bubble, means for forming and simultaneously viewing an image of the luminous body and of the bubble in the same field of view, means for causing illumination of the image of the bubble while completely preventing the illumination of the field on which said images are formed whereby the luminosity of the celestial body is not impaired and both images are rendered clearly discernible, means for deviating the light forming the image of the celestial body, and means including a driving member in one of said handles and drivably connected to said light deviating means for measuring the angle of such deviation.

14. In an instrument for measuring the angle of a luminous celestial body above a horizontal plane, the combination of means constituting a pair of handles for holding the instrument in operating position, means for indicating said horizontal plane, means for forming an image of said indicating means and of the celestial body in the same field of view, means including a luminescent material associated with said indicating means for causing illumination of the image of the latter while completely preventing the illumination of the field on which said images are formed whereby the luminosity of the celestial body is not impaired and both images are rendered clearly discernible on a dark background, means for deviating the light forming the image of the celestial body, and means including a driving member in one of said handles and drivably connected to said light deviating means for measuring the angle of such deviation.

15. In apparatus for measuring the angle between two objects, the combination of a pair of spaced parallel plates, means formed with said plates and constituting a pair of handles for holding the apparatus in operating position, means between said plates for forming images of said objects in a common focal plane, a rotatable reflecting member associated with said image-forming means, and means including a driving member positioned interiorly of one of the handles and drivably connected to the rotatable reflecting member for measuring the angle of rotation of said reflecting member.

16. In apparatus for measuring the angle between two objects, the combination of a pair of parallel plates, means securing said plates in spaced relation, means formed with said plates to provide handles for holding the apparatus in operating position and comprising a pair of drums one of which forms a hollow casing, means between said plates for forming images of said objects in a common focal plane, a rotatable reflecting member associated with said image-forming means, and means including a driving member positioned interiorly of one of the handles and drivably connected to said rotatable reflecting member for measuring the angle of rotation of said reflecting member.

17. An instrument for measuring the angle between two objects, comprising in combination, a pair of spaced parallel plates, means formed with said plates to provide handles for holding the instrument in operating position, means between said plates for forming images of said objects in a common focal plane, a rotatable reflecting member associated with said image-forming means, a liquid level constituting a part of the optical system of said image-forming means for providing an artificial horizon and comprising a vessel containing a homogeneous liquid having a heterogeneous body floating therein, means for passing a light through said liquid transversely of the vessel and from all sides of the latter so that the heterogeneous body which serves as a reference member with which the image viewed through the rotatable reflecting member is correlated, is illuminated without producing any apparent illumination of the liquid, and means including a driving member positioned interiorly of one of the handles and drivably connected to said rotatable reflecting member for measuring the angle of rotation of said reflecting member.

18. An instrument for measuring the angle of an object with respect to the horizontal comprising in combination, a pair of parallel plates, means securing said plates in spaced relation, means formed with said plates to provide handles for holding the instrument in operating position and formed to constitute a pair of drums, one of which comprises a hollow casing, means between said plates for forming images of the object and of a bubble in a common focal plane, a rotatable index prism associated with said image-forming means, a liquid level constituting part of the optical system of said image-forming means for providing an artificial horizon by means of a bubble with which the image of the object viewed through the index prism may be correlated, said liquid level comprising a vessel having transparent side walls and a transparent bottom and cover glass, a transparent liquid in said vessel forming a bubble, luminous means associated with said vessel for emitting artificial light on all sides of the bubble through the liquid, said luminous means being arranged to cause illumination of the bubble without producing apparent illumination of the liquid so that the bubble appears in the form of a luminous ring on a dark background, and means including a driving member positioned interiorly of one of the handles and drivably connected to said rotatable index prism for measuring the angle of rotation of said prism.

19. In apparatus for measuring the angle between two objects, the combination of means constituting a pair of handles for holding the apparatus in operating position, means for forming images of said objects in a common focal plane, a rotatable reflecting member associated with said image-forming means, and means including a driving member positioned interiorly of one of the handles and drivably connected to the rotatable reflecting member for measuring the angle of rotation of said reflecting member.

20. In apparatus for measuring the angle between two objects, the combination of means to provide handles for holding the apparatus in operating position and comprising a pair of drums one of which forms a hollow casing, means for forming images of said objects in a common focal plane, a rotatable reflecting member associated with said image-forming means, and means including a driving member positioned interiorly of one of the handles and drivably connected to said rotatable reflecting member for measuring the angle of rotation of said reflecting member.

21. An instrument for measuring the angle between two objects, comprising in combination, means to provide handles for holding the instrument in operating position, means for forming images of said objects in a common focal plane, a rotatable reflecting member associated with said image-forming means, a liquid level constituting a part of the optical system of said image-forming means for providing an artificial horizon and comprising a vessel containing a homogeneous liquid having a heterogeneous body floating therein, means for passing light through said liquid transversely of the vessel and from all sides of the latter so that the heterogeneous body which serves as a reference member with which the image viewed through the rotatable reflecting member is correlated, is illuminated without producing any apparent illumination of the liquid, and means including a driving member positioned interiorly of one of the handles and drivably connected to said rotatable reflecting member for measuring the angle of rotation of said reflecting member.

22. An instrument for measuring the angle of an object with respect to the horizontal, comprising in combination, means to provide handles for holding the instrument in operating position and formed to constitute a pair of drums one of which comprises a hollow casing, means for forming images of the object and of a bubble in a common focal plane, a rotatable index prism associated with said image-forming means, a liquid level constituing part of the optical system of said image-forming means for providing an artificial horizon by means of a bubble with which the image of the object viewed through the index prism may be correlated, said liquid level comprising a vessel having transparent side walls and a transparent bottom and cover-glass, a transparent liquid in said vessel forming a bubble, luminous means associated with said vessel for emitting artificial light on all sides of the vessel through the liquid, said luminous means being arranged to cause illumination of the bubble without producing apparent illumination of the liquid so that the bubble appears in the form of a luminous ring on a dark background, and means including a driving member positioned interiorly of one of the handles and drivably connected to said rotatable index prism for measuring the angle of rotation of said prism.

VICTOR E. CARBONARA.